Figure 1:
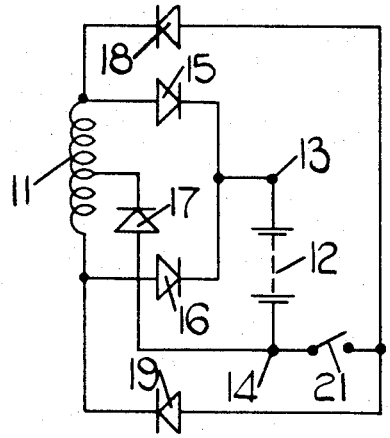

United States Patent Office 3,400,318
Patented Sept. 3, 1968

3,400,318
BATTERY CHARGING SYSTEMS
William Frank Hill, Stafford, England, assignor to Joseph Lucas Industries Limited, Birmingham, England
Filed Aug. 15, 1966, Ser. No. 572,264
Claims priority, application Great Britain, Aug. 25, 1965, 36,450/65
5 Claims. (Cl. 320—41)

This invention relates to battery charging systems for use in road vehicles.

A battery charging system according to the invention comprises in combination a pair of terminals between which in use the battery is connected, an alternator, first and second rectifying means each connecting the output winding or windings of the alternator to said terminals, the first and second rectifying means being coupled to the output winding or windings of the alternator in such a way that below a predetermined alternator speed the first rectifying means is capable of supplying a greater output current to the terminals than the second rectifying means, but above the predetermined alternator speed the second rectifying means is capable of supplying a greater output current to said terminals than the first rectifying means, and automatically operable switch means for controlling which of said rectifying means is operating so as to enable maximum output current to be obtained from the alternator at any given time.

Considering for convenience the case of a single phase alternator, if a graph is drawn with one axis representing the output current of the alternator, and the other axis representing the speed of the alternator, then the nature of the curve drawn on this graph will depend on the number of turns in the armature. Assuming that two curves are drawn on the graph representing a large number of armature turns and a small number of armature turns respectively, it is found that above a predetermined speed, the curve representing the smaller number of armature turns will give the larger output current, but below the predetermined speed, the curve representing the larger number of turns will give the larger output current. This is because above the predetermined speed the effect of armature reaction and leakage inductance, which are dependent upon the number of turns in the armature, become important. Thus, it will be appreciated that the output current of any given alternator could be increased at high engine speeds by using fewer turns in the armature, but if such a course were to be adopted, the output current at low engine speed would be reduced. Consequently it is necessary in present alternators to reach some compromise between the two factors. The present invention enables far better use to be made of the potential output of the alternator, because the automatic switch means can be set so that above the predetermined engine speed fewer turns are used than below the predetermined engine speed. As will be explained, it is not vital for the automatic switch means to be speed-sensitive, and the benefits of the invention can be obtained with other forms of automatic switch means. Moreover, although this simplified explanation refers for convenience to a single phase alternator, similar arrangements can be utilised with multi-phase alternators with a similar effect, as will be explained.

In the accompanying drawings,

FIGURES 1 to 4 are circuit diagrams illustrating respectively four examples of the invention.

Referring to FIGURE 1, there is shown a single phase alternator including an armature winding 11. The battery 12 to be charged is connected between terminals 13, 14, the terminal 13 being connected to opposite ends of the winding 11 through the cathodes and anodes of a pair of diodes 15, 16 respectively. Moreover, the terminal 14 is connected to the mid-point of the winding 11 through the anode and cathode of a diode 17, whilst opposite ends of the winding 11 are connected to the cathodes of a pair of diodes 18, 19, the anodes of which are connected through a switch 21 to the terminal 14.

The switch 21 is speed sensitive, and can be a mechanical switch or a controlled semi-conductor device, and may be operable by any suitable known speed-sensing means such as a frequency sensitive electronic circuit driven from the alternator output or a centrifugally operated switch or transducer, or by a switch linked to the throttle mechanism. Below a predetermined engine speed the switch is closed, and under these conditions the diode 17 is permanently reverse biased and plays no part in the operation of the circuit. During one half cycle of the alternator output, the battery 12 is charged through the diode 15, the switch 21 and the diode 19, and during the other half cycle battery is charged by way of diode 16, switch 21 and diode 18.

When the predetermined speed is exceeded, the switch 21 opens, so that the diodes 18, 19 are now connected back-to-back across the winding 11, and play no part in the operation of the circuit. In these circumstances the battery is charged during one half cycle by way of the diode 17 and the diode 16, and during the other half cycle it is charged by way of the diode 17 and the diode 15. Thus, only one half of the winding 11 is effective at any one time.

The simplified circuit diagram shown does not illustrate any voltage regulation. In the case where the alternator is a permanent magnet alternator, the diodes 15, 16 can be constituted by thyristors the conduction of which is controlled by means dependent upon the voltage across the battery, so as to regulate the supply to the battery. Alternatively, in the case of an alternator using a field winding, a voltage regulator of any convenient known form can be connected between the terminals 13, 14 to vary the field current to the alternator.

Figure 2:
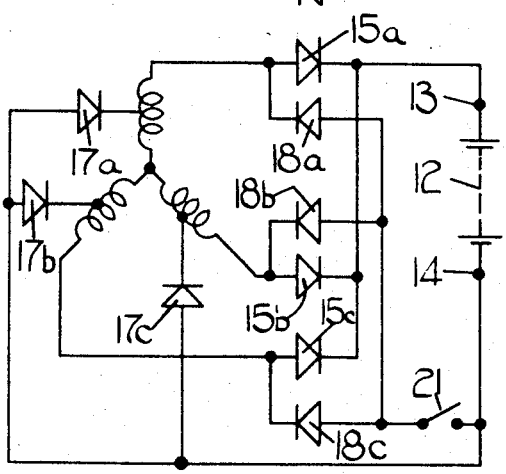

Referring now to FIGURE 2, an example of the invention is illustrated as applied to a three-phase star-connected alternator. In this example three diodes 15a, 15b, 15c are provided, these diodes being equivalent to the diodes 15, 16 in FIGURE 1 and serving to connect the ends of the windings to the terminal 13. Three further diodes 18a, 18b, 18c equivalent to the diodes 18, 19 in FIGURE 1 connect the ends of the windings to the terminals 14 by way of the switch 21, and three further diodes 17a, 17b, 17c, equivalent to the diodes 17, serve to connect the mid-points of the windings to the terminal 14. The charging paths when the switch 21 is closed is from the end of one of the windings through one of the diodes 15, by way of the terminal 13, battery 12 and terminal 14, and thence by way of the switch 21, one of the diodes 18 and another winding to the star point. However, when the switch 21 is opened, the charging path is by way of one of the diodes 15, the battery, one of the diodes 17 and one half of another winding to the star point. Thus, with the switch open the number of effective turns in the armature is reduced by one half of one winding.

Figure 3:
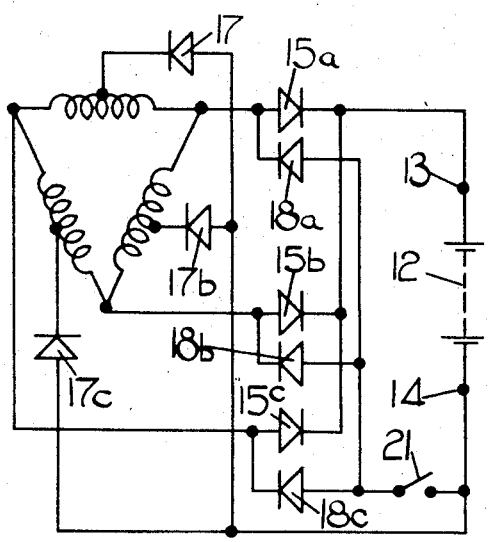

In FIGURE 3, the windings are delta-wound, but the arrangement of the diodes is similar to that shown in FIGURE 2. The operation is also similar, the charging path being by way of diodes 15 and 18 when the switch 21 is closed, but by way of diodes 15 and 17 when the switch 21 is open.

Figure 4:
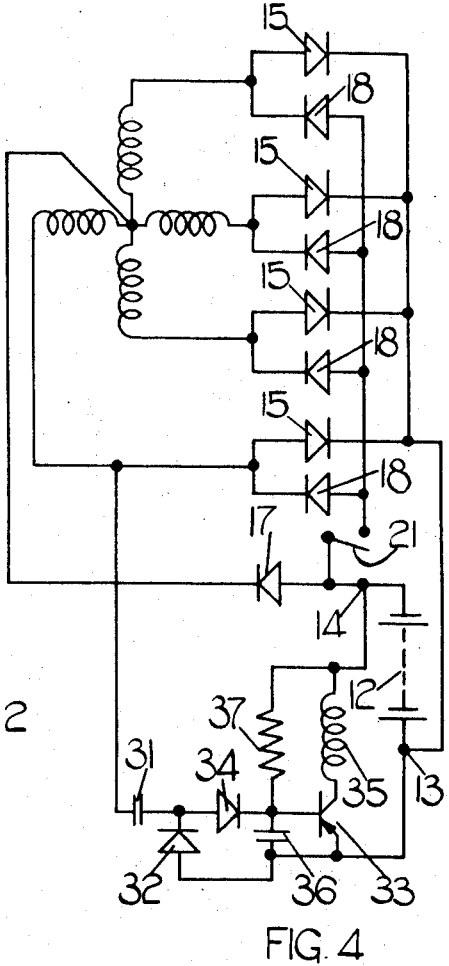

Turning now to FIGURE 4, an example of the invention is shown as applied to a four-phase alternator. In this case there are four diodes 15 and four diodes 18, as would be expected from a consideration of FIGURES 2 and 3. However, in this arrangement a single diode 17 is sufficient to provide the required charging path when the switch 21 is open. The charging path is, of course, by way of the diodes 15, 18 when the switch 21 is closed.

In all the examples so far described, the speed-sensitive switch 21 can be operated in a number of ways, but FIGURE 4 illustrates a particularly convenient arrangement for operating the switch 21. Referring to FIGURE 4 again, the cathode of one of the diodes 18 is connected to the terminal 13 through a capacitor 31 and the cathode-anode path of the diode 32 in series. The junction of the capacitor 31 and diode 32 is connected to the base of a p-n-p transistor 33 through the anode-cathode part of the diode 34, the transistor 33 having its emitter connected to the terminal 13, its collector connected to the terminal 13, 14 through a capacitor 36 and a resistor 37 respectively. The arrangement is such that below a predetermined alternator speed, the transistor 33 is maintained conductive by current flowing through the resistor 37, so that the coil 35 is energised and the switch 21 is on. However, at the predetermined speed, the diode pump circuit constituted by the components 31, 32, 34, 36 charges the capacitor 36 to a voltage such that the transistor 33 is turned off, so that the switch 21 opens.

In a minor modification of this example, the switch 21 is a two-position switch which in one position completes the circuit to the anodes of the diodes 18, and in its other position completes the circuit to the star point. With such an arrangement, the diode 17 is not required.

Although in all the examples described the switch 21 is speed-sensitive, it is found that the system will operate satisfactorily for many applications with a current-sensitive switch. This switch may be in the form of a relay in the direct current output lines, the relay operating at a predetermined current. Alternatively, a semi-conductor current-sensitive circuit could be used, or a combination of such a circuit as a current-sensitive switch. The current can be chosen to correspond to the predetermined speed closely when the demand for current from the alternator is high so that, in the case of a wound alternator, maximum field current is supplied, or, in the case of a permanent magnet alternator, the thyristors in the regulator conduct in the manner of diodes. Where the demand for current is less than the current available, the operating current may not correspond to the predetermined speed, but as the alternator is providing more than the required output anyway, the position of the switch does not matter.

In another modification, the switch is controlled by the throttle pedal of the vehicle, so as to be operated when the throttle pedal is at a predetermined position. In yet another modification, the switch 21 is operated by the manifold pressure.

It will be appreciated that in each of the examples two separate rectifying means are provided, although of course some of the diodes are common to both rectifying means.

Having thus described my invention what I claim as new and desire to secure by Letters Patent is:

1. A battery charging system for use in a road vehicle comprising in combination a pair of terminals between which in use the battery is connected, an alternator, first and second rectifying means each connecting the output winding of the alternator to said terminals, the first and second rectifying means being coupled to the output winding of the alternator in such a way that below a predetermined alternator speed the first rectifying means is capable of supply a greater output current to the terminals than the second rectifying means, but above the predetermined alternator speed the second rectifying means is capable of suplying a greater output current to said terminals than the first rectifying means, and automatically operable switch means for controlling which of said rectifying means is operating so as to enable maximum output current to be obtained from the alternator at any given time.

2. A system as claimed in claim 1 in which the switch means is sensitive to the speed of the alternator.

3. A system as claimed in claim 2 in which the switch means is sensitive to the alternator output current.

4. A system as claimed in claim 1 in which the switch is sensitive to the position of the throttle pedal of the vehicle.

5. A system as claimed in claim 1 in which the switch is sensitive to the manifold pressure of the engine of the vehicle.

References Cited

UNITED STATES PATENTS

| 3,339,107 | 8/1967 | Aldenhoff | 321—27 X |
| 3,353,090 | 11/1967 | Sawyer | 322—30 |

LEE T. HIX, *Primary Examiner.*

S. M. WEINBERG, *Assistant Examiner.*